3,461,789
AIR SUPPLY SYSTEM FOR AUTOMOTIVE VEHICLE
Teodoro A. Texidor, 6720 Navajo,
Lincolnwood, Ill. 60645
Filed Oct. 25, 1967, Ser. No. 678,092
Int. Cl. B60h 1/24
U.S. Cl. 98—1.5                                              6 Claims

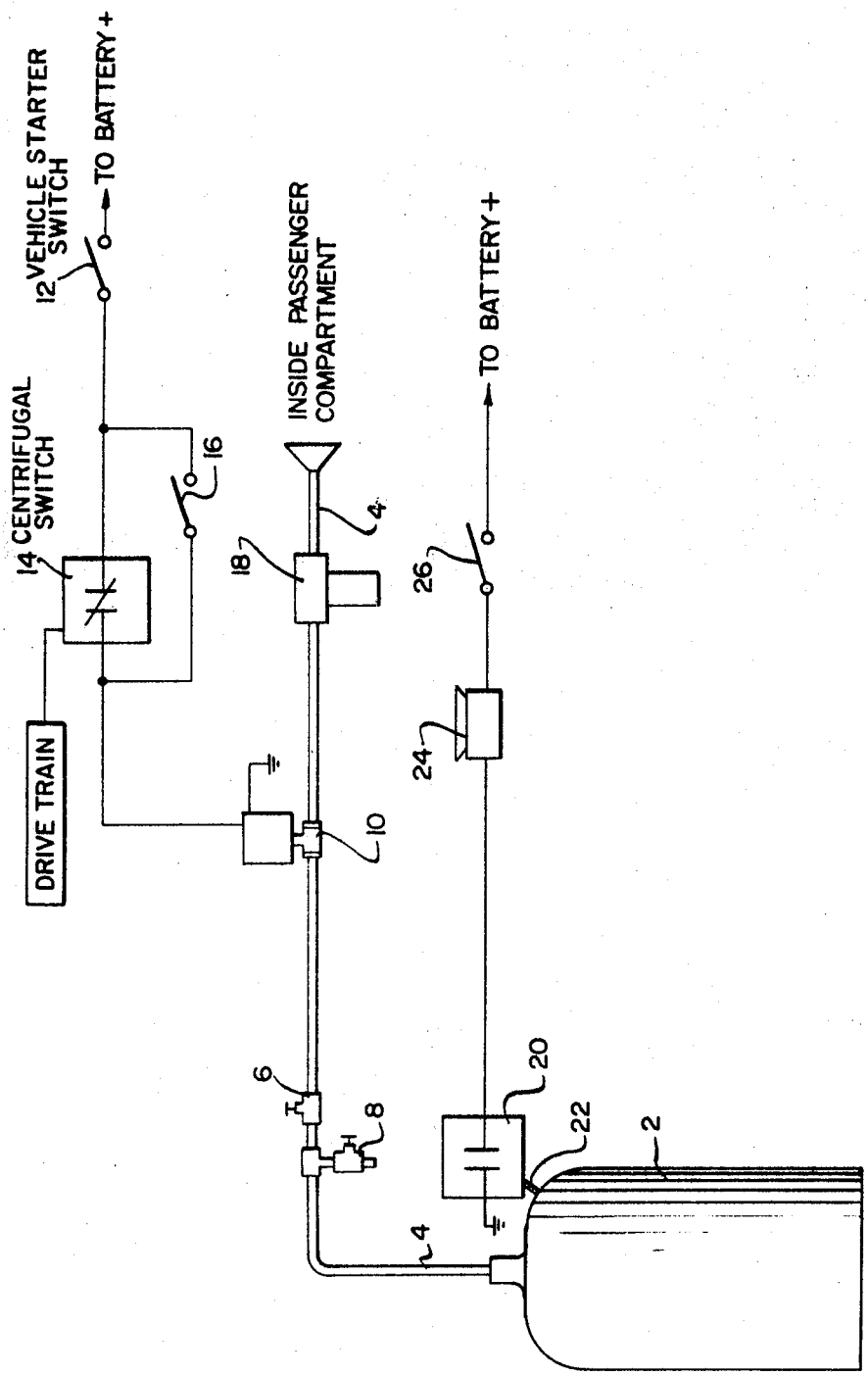

ABSTRACT OF THE DISCLOSURE

A system for substantially eliminating the toxic effects of air pollutants upon operators and passengers of automotive vehicles, such as automobiles, trucks, buses, trains, etc. The system involves the introduction of a gas, preferably pure air, into the occupied portions of an automotive vehicle, which portions are sealed to prevent appreciable quantities of air on the exterior of the vehicle from entering therein. This prevents the highly contaminated and often toxic air frequently encountered while operating an automotive vehicle in heavy urban traffic from entering the vehicle while simultaneously supplying the occupants with essentially pure, uncontaminated air.

---

As has become quite well known, the air pollution problem developing with considerable rapidity in urban areas due to automotive and industrial wastes being introduced into the atmosphere has become quite serious. It has been shown that the high degree of air pollution in urban areas subject to particularly dense automotive traffic can produce toxic effects both upon vehicle operators and passengers. These toxic effects are produced primarily during the slow movement of masses of automotive vehicles through urban areas. The effects range from the production of burning, watering eyes, nasal and respiratory irritations varying in severity to fatigue. Any of these toxic effects can produce a dangerous drop in the overall alertness and efficiency of a vehicle operator to a degree sufficient to constitute a significant safety hazard in the continued operation of the vehicle.

The system of the invention is designed to substantially reduce or eliminate the toxic effects of air pollution in the operation of an automobile vehicle by keeping the polluted air out of the occupied portion of the vehicle and by providing a supply of fresh pure air or suitable gas mixture to the occupied portion of the vehicle as selectively required by the occupants thereof.

The system of the invention utilizes a pressure tank which is filled with a suitable gas or gas mixture, such as pure air. This pressure tank is interconnected with the passenger compartment of a vehicle. The transmission of air from the pressure tank to the passenger compartment is accomplished through a connecting conduit. This conduit can be selectively opened and closed by a predetermined condition of the vehicle such as its speed of movement, engagement of preselected gears, actuation of the starter mechanism of the vehicle, a manual off-on switch, or a detected atmospheric condition inside or outside of the vehicle.

A pressure sensing circuit may be connected to the pressure tank of the invention to continuously indicate the pressure of the gas contained in the tank. The pressure sensor can be connected to an alarm system which will indicate by visual or auditory means the occurrence of low pressure in the pressure tank and warn of the need for refilling.

The system of the invention also utilizes a regulator device to regulate the rate of gas flow from the tank to the passenger compartment depending upon both the pressure of the compartment and the number of passengers therein. The pressure in the passenger compartment is maintained at a level at least slightly above that of atmospheric pressure on the exterior of the vehicle to inhibit the entry of atmospheric air.

The system of the invention is preferably interconnected with an air conditioning unit carried by the vehicle.

The system of the invention is designed for use primarily in connection with vehicular traffic moving slowly through dense urban areas having high degrees of air pollution. The system, however, may be usefully employed to overcome the mild fatigue which often occurs during long periods of driving through areas where little or only moderate air pollution exists.

Various objects and advantages of the invention will hereinafter become more fully apparent from the following description of the drawings illustrating presently preferred embodiments thereof and wherein:

The figure is a schematic illustration of the system of the invention as it would be utilized in a vehicle such as an automobile.

The system of the invention is designed to alleviate the effects of air pollution in closed areas in automotive vehicles such as automobiles, buses, trains, etc. by the addition of pure air or a preselected gas mixture through a standard cooling and/or heating air conditioning unit used in conjunction with the automotive vehicle. The system illustrated in the drawing therefore would normally be installed in the vehicle in a manner such that the pure air or gas mixture would be introduced into the air conditioning unit to permit its discharge therefrom into the area of the vehicle being treated.

Referring now to the drawing, the system of the invention utilizes a pressure tank 2 which is designed to contain pure air or other suitable gaseous mixture at a pressure of about 200 p.s.i. Communication is established between tank 2 and the passenger or occupant compartment of an automotive vehicle through a conduit 4. A manually operable shut-off valve 6 is provided in conduit 4 adjacent pressure tank 2 to permit shutting off of the conduit 4 during the replacement or filling of the pressure tank. A second manually operable valve 8 is disposed between the pressure tank and valve 6 in conduit 4 and serves to permit the re-filling of pressure tank 2 without the removal thereof. In normal operation of the system of the invention, manually operable valve 6 is maintained in a normally open condition and the second or filler valve 8 is maintained in a normally closed condition.

A normally closed solenoid valve 10 is connected to conduit 4 downstream from valves 6 and 8. This valve is connected to the battery or the electrical system of the automotive vehicle in which it is installed. In a vehicle such as an automobile, the solenoid valve 10 can be connected to the ignition switch or starter 12 of the automobile.

A centrifugal switch 14 is connected in the circuit between the solenoid valve 10 and the starter 12. This switch 14 permits the intermittent introduction of fresh air from tank 2 into the passenger compartment of an automobile by connecting it to the differential or other part of the drive train and setting it to close when the vehicle speed reaches a predetermined level and to open when the vehicle speed reaches another level. In the alternative, a switch could be connected to one of the drive gears of an automobile in a manner such that engagement of the gear would close the switch and thereby open the normally closed solenoid valve 10 to permit air or gas to pass through conduit 4.

In order to over-ride the operation of the centrifugal switch 14, a manually operable by-pass switch 16 is interposed in the circuit between solenoid valve 10 and switch 12 and can be actuated to operate solenoid valve 10. The by-pass switch 16 may also be used to by-pass the ignition or starter switch 12 so that the solenoid may be energized at will and irrespective of the starter.

Downstream from the solenoid valve 10, a regulator 18 is connected to conduit 4 and serves to keep the flow of air or gas from tank 2 at a constant predetermined rate and pressure. In the preferred embodiment of the invention, the preselected rate is based on the number of occupants in the passenger compartment. Therefore, a dial may be used to set the regulator for the number of occupants in the passenger compartment permitting a controlled amount of air sufficient for the comfort of the passengers to enter the compartment. The conduit for conducting air from the pressure tank is preferably connected to end inside of the vehicle or in the plenum of the air conditioning unit connected to the vehicle.

In order to keep the operator or passengers in the vehicle advised as to the condition of the pressure tank, a pressure switch 20 is made to communicate with the interior of pressure tank 2 through a conduit 22. Pressure switch 20 is connected to a suitable buzzer 24 which will serve as an alarm or warning indicator to the occupants of the passenger compartment that the pressure tank has reached a level insufficient to permit continued operation of the system. The buzzer can be silenced by a conventional manually operable switch 26. The substitution of a visually observable flashing light or other indicator is considered to be within the scope of the invention.

Since in automotive vehicles of most types it is almost impossible to hermetically seal or maintain a hermetic seal of the vehicle to prevent the entry of atmospheric or outside air into the vehicle, the system of the invention is designed to supply sufficient air to the occupied portion of the vehicle to maintain it at a pressure slightly in excess of atmospheric pressure out of the vehicle. This serves to insure the presence only of pure air or the desired mixture of gases within the occupied portion of the vehicle.

I claim:
1. A system for substantially eliminating the toxic effects of air pollutants upon passengers in an automotive vehicle having a drive train, starter means for actuating the drive train, a passenger compartment provided with entry and exit means and having means for substantially sealing the compartment against the entry of appreciable quantities of exterior air therein comprising a pressure tank in the vehicle for containing a pressurized uncontaminated gas, means for establishing communication between the pressure tank and the passenger compartment, means for selectively regulating the flow of gas from the pressure tank to the passenger compartment, the means for selectively regulating gas flow being energized by actuation of the vehicle starter means and gas flow being automatically controlled by a centrifugal switch connected to the drive train of the vehicle which establishes gas flow to the compartment at a predetermined operational level of the drive train and stops gas flow to the compartment at a predetermined operational level of the drive train, and means for maintaining the passenger compartment at a pressure exceeding the atmospheric pressure outside of the compartment.

2. The system of claim 1 wherein a manually operable by-pass switch is provided to permit the selective manual by-passing of the action of the centrifugal switch.

3. The system of claim 2 wherein the centrifugal switch is electrically connected to an electrically operable valve, the electrically operable valve being opened and closed by preselected conditions of the centrifugal switch, the electrically operable valve being disposed in the means establishing communication between the pressure tank and the passenger compartment to start and stop air flow from the tank to the compartment.

4. A system for substantially eliminating the toxic effects of air pollutants upon passengers in an automotive vehicle having drive means, a passenger compartment provided with entry and exit means and having means for substantially sealing the compartment against the entry of appreciable quantities of exterior air therein comprising a pressure tank in the vehicle for containing a pressurized uncontaminated gas, means for establishing communication between the pressure tank and the passenger compartment, means for selectively regulating the flow of gas from the pressure tank to the passenger compartment, including actuator means connected to the drive means of the vehicle for sensing predetermined conditions thereof and for starting and stopping gas flow into the passenger compartment in response to such predetermined conditions, and means for maintaining the passenger compartment at a pressure exceeding the atmospheric pressure outside of the compartment.

5. The system of claim 4 wherein the means for selectively regulating gas flow into the passenger compartment of the vehicle includes regulator means for providing the predetermined and selective variation of the gas flow into the passenger compartment according to predetermined condition level within the compartment.

6. A system for substantially eliminating the toxic effects of air pollutants upon passengers in an automotive vehicle having a passenger compartment provided with entry and exit means and having means for substantially sealing the compartment against the entry of appreciable quantities of exterior air therein comprising a pressure tank in the vehicle for containing a pressurized uncontaminated gas, means for establishing communication between the pressure tank and the passenger compartment, means for selectively regulating the flow of gas from the pressure tank to the passenger compartment, manual shutoff and refilling means disposed between the tank and the passenger compartment, pressure sensing means provided in communication with the pressure tank to determine the pressure of the gas therein and to indicate the amount of pressure therein, alarm means connected to the pressure sensing means for indicating a low gas supply condition in the pressure tank, and means for maintaining the passenger compartment at a pressure exceeding the atmospheric pressure outside of the compartment.

References Cited

UNITED STATES PATENTS

| 1,461,700 | 7/1923 | Nichols | 98—1.5 |
| 1,979,981 | 11/1934 | McKesson | 98—1.5 |
| 2,228,315 | 1/1941 | Hutton | 98—1.5 |

MEYER PERLIN, Primary Examiner

U.S. Cl. X.R.

98—2